United States Patent [19]

Petersson

[11] Patent Number: 5,752,462
[45] Date of Patent: May 19, 1998

[54] TEAT CUP INFLATION

[75] Inventor: Lennart G. Petersson, Douglas, Mass.

[73] Assignee: IBA, Inc., Millbury, Mass.

[21] Appl. No.: 446,489

[22] Filed: May 22, 1995

[51] Int. Cl.[6] .................................................. A01J 5/06
[52] U.S. Cl. .................................................. 119/14.47
[58] Field of Search ........................... 119/14.47, 14.48, 119/14.49, 14.5, 14.51, 14.52, 14.53

[56] References Cited

U.S. PATENT DOCUMENTS

| | | | |
|---|---|---|---|
| 766,847 | 8/1904 | Sharples | 119/14.52 |
| 1,425,584 | 8/1922 | Gessler | 119/14.49 |
| 1,690,327 | 11/1928 | Dinesen | 119/14.52 |
| 2,099,884 | 11/1937 | Green | 118/14.51 |
| 2,211,515 | 8/1940 | Orre | 119/14.52 |
| 2,574,063 | 11/1951 | Richwine | 119/14.49 |
| 2,612,136 | 9/1952 | Davis | 119/14.43 |
| 3,967,587 | 7/1976 | Noorlander | 119/14.49 |
| 5,224,442 | 7/1993 | Davies | 119/14.47 X |

Primary Examiner—Robert P. Swiatek
Assistant Examiner—Elizabeth Shaw
Attorney, Agent, or Firm—Terry M. Crellin

[57] ABSTRACT

An inflation for an automatic milking machine is molded as an integral unit from an elastomeric material. The inflation is formed to have an elongate, hollow barrel. The barrel has a substantially square cross-sectional shape and terminates in open upper and lower ends. A substantially cylindrical head is molded integrally to the upper end of the barrel. The head has a substantially cylindrical side wall. A diaphragm-like mouthpart is positioned across the otherwise open, upper end of the cylindrical side wall, with the mouthpart having a central opening that is adapted to accommodate the teat of an animal to be milked. A transition section is molded in the head so as to connect the upper end of the barrel with an inner surface of the side wall to form an internal, mouthpiece chamber between the transition section and the mouthpart. The transition section has an outwardly curved surface that curves from the upper end of the barrel to an inner surface of the side wall in a smooth curve having a radius of about 0.430 inch to about 0.445 inch.

6 Claims, 2 Drawing Sheets

TEAT CUP INFLATION

BACKGROUND OF THE INVENTION

1. Field of the Invention

The present invention relates to teat cup inflations used in teat cup assemblies for milking cows. In particular, the invention relates to an inflation that is a one-piece, molded, elastomeric member having a hollow elongate barrel that has a substantially square cross-sectional shape.

2. State of the Art

There has been much effort made in the past to provide improved teat cup inflations that massage the teats of a cow and otherwise are designed to be less likely to cause mastitis in the teats of the cows being milked. Attention is directed to U.S. Pat. Nos. 3,659,558 and 3,967,587 wherein there is generally specified the inadequacies of the prior art inflations, particularly as to undesirable conditions imposed on the teats of a cow by inflations of the prior art.

An improved inflation is disclosed in U.S. Pat. No. 3,967,587 in which the barrel of the inflation has a substantially square cross-sectional shape. At the upper or proximate end of the barrel there is a cylindrical head molded integrally to the barrel. The head has a reversely extending flange that fits over the upper end of the shell of the teat cup assembly. A mouthpart or diaphragm is provided at the upper end of the cylindrical head, with the mouthpart having a central opening for receiving the teat of a cow.

A transition section was molded in the cylindrical head to connect the upper end of the barrel with an inner surface of the cylindrical side wall of the cylindrical head. The transition section curved outwardly from the upper end of the barrel to the cylindrical side wall in a smooth arc having a radius of about 0.625 inches. For proper placement of the cows teat in the barrel, the mouthpart or diaphragm of the cylindrical head was spaced by about ⅛ of an inch from the juncture of the transition section with the cylindrical side wall. The space formed internal to the inflation between the transition section and the mouthpart is conventionally referred to as the mouthpiece chamber.

The square-shaped inflation was a significant advancement in the art and was used widely by dairies. However, current demands on the management aspects of dairying have resulted in drastically increased milk production as well as improved man-hour efficiencies. The increase in milk production has put greater demands on physiological systems of the dairy cow. The increase in the size of teats and udders, which in many cases are results of increased milk production, have changed the demands for specific designs and types of inflations. Also, dairy cows with increased milk production have characteristically increased volume of milk flow at any given time during the milking process. This puts additional demands on the capacity of milking components, since a milking system that is experiencing excessive fluid flow, increases instability that ultimately results in an undesirable decrease in milkout performance. It would be highly advantageous to improve the inflations of milking apparatus to meet the demands of the present dairy industry.

OBJECTIVES AND BRIEF DESCRIPTION OF THE INVENTION

A principal objective of the invention is to provide an improvement on the square-shaped inflation of the prior art which allows better teat positioning of the teat in the inflation during milking.

A particular objective of the present invention is to provide an improved mouthpiece for the inflation wherein an advantageous increase in the volume of the mouthpiece without an overall increase in the size of the mouthpiece itself.

Another objective of the present invention is to provide an improvement in the transition between the anterior portion of the square-shaped barrel and the tailpiece that decreases the restriction of milk flow and enhances the vacuum stability in the inflation.

The above objectives are achieved in accordance with the present invention by providing novel, unique improvements in the square-shaped inflations of the prior art that unexpectedly produce a significant enhancement in the milking performance while at the same time improve teat and udder health of the cows being milked.

The square-shaped inflations, as are well known in the art, have an elongate, hollow barrel that is substantially square in cross-sectional shape. A substantially cylindrical head is molded integrally to the upper end of the square-shaped barrel. The head comprises a substantially cylindrical side wall that has a diameter greater than the outer diagonal dimension of the barrel. A mouthpart, a diaphragm-like member, extends across the otherwise open, upper end of the cylindrical side wall. The mouthpart has a central opening that is adapted to accommodate, i.e., receive therethrough, a teat of an animal that is to be milked. A transition section is molded in the head to connect the upper end of the barrel with an inner surface of the cylindrical side wall of the head.

The square-shaped inflation as described in the preceding paragraph is well known in the art. The transition section of the inflations of the prior art, as well as the inflations of the present invention, has an outwardly curved surface that curves from the upper end of the barrel to an inner surface of the cylindrical side wall of the head in a smooth curve. In the inflations of the prior art the curve of the transition section has a radius of about 0.625 inch. The distance between the mouthpart and the juncture of the transition section with the sidewall of the head of the inflations of the prior art is about ⅛ of an inch. In accordance with the present invention, the curve of the transition section has a radius of about 0.430 inch to about 0.445 inch. This change in the radius of the curve of the transition section increases the distance between the mouthpart and the juncture of the transition section with the side wall of the head to at least about ¼ of an inch.

The increase in the spacing between the transition section and the mouthpart of the inflation of the present invention results in an increase in the volume of the mouthpiece chamber, i.e., the chamber formed between the transition section and the mouthpiece. This increase in volume of the mouthpiece chamber is accomplished with no other changes in the shape or dimensions of the head of the inflation.

The increase in the volume of the mouthpiece chamber has been found to result in an unexpected, significant improvement in milking efficiency and performance, while at the same time helping maintain good teat and udder health. The increased volume of the mouthpiece chamber results in improved vacuum stability in the inflation as well as better positioning of the teat in the square-shaped barrel of the inflation to achieve proper massage action on the teat. The increase in volume of the mouthpart has further been unexpectedly found to result in more efficient milking of the cow, with more complete emptying of milk from the udder of the cow.

In inflations of the prior art, as well as those of the present invention, an elongate, cylindrical, hollow tailpiece extends from the lower end of the square-shaped barrel. A second transition section connects the lower end of the square-shaped barrel to the upper end of the hollow, cylindrical tailpiece, and the tailpiece then extends downwardly substantially coaxially from the lower end of the square-shaped barrel. The second transition of the prior art inflations curved continuously inwardly in a convex curve from the upper end of the hollow, cylindrical tailpiece to the inner surface of the square-shaped barrel at the lower end of the square-shaped barrel.

In accordance with the present invention, the second transition is curved in a compound convex and concave shape. At the lower end of the barrel, the second transition curves inwardly in a concave curve in an arc of no more than 90 degrees, with the arc having a radius of about 0.450 inch to 0.55 inch. The second transition then curves in a convex curve downwardly in an arc of no more than 90 degrees to join the upper end of the cylindrical, internal surface of the tailpiece. The arc of the convex curve portion of the second transition has a radius of about 0.60 inch to 0.65 inch. The compound concave and convex curve of the second transition of the inflation of the present invention produces a smoothly curved but straighter and more vertical entry into the tailpiece. This results in an unexpected decrease in the restriction to milk flow and greatly enhances the vacuum stability of the inflation.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

In accordance with the present invention, an improved inflation is provided for a teat cup assembly of a milking machine. The inflation is molded as an integral unit from an elastomeric material. The inflation comprises an elongate, hollow barrel 12 that has a substantially square cross-sectional shape and terminates in open upper and lower ends. The opposite sides of the barrel 12 are spaced from each other by a distance of between about 11/16 of an inch and 13/16 of an inch.

A substantially cylindrical head 14 is molded integrally to the upper end of the barrel 12. The head 14 is substantially cylindrical, with the cylindrical side wall of the head 14 having an inner diameter that is at least about 3/8 of an inch greater than an outer diagonal dimension of the barrel 12. A diaphragm-like mouthpart 20 is positioned across the otherwise open, upper end of the cylindrical side wall of the head 14. The mouthpart 20 has a central opening that is adapted to accommodate the teat of an animal to be milked.

The cylindrical side wall of the head 14 is connected to the barrel 12 by a transition section 22 that is molded in the head 14 so as to connect the upper end of the barrel 12 with an inner surface of the cylindrical side wall of the head 14.

An internal, mouthpiece chamber is formed between the transition section and the mouthpart 20. The transition section 22 has an outwardly curved surface that curves from the upper end of the barrel 12 to an inner surface of the cylindrical side wall of the head in a smooth curve having a radius of about 0.430 inch to about 0.445 inch. The outwardly curved surface of the transition section joins the inner surface of the side wall at a juncture that is spaced from an inner surface of the mouthpart by at least about 1/4 of an inch.

Figure 1:
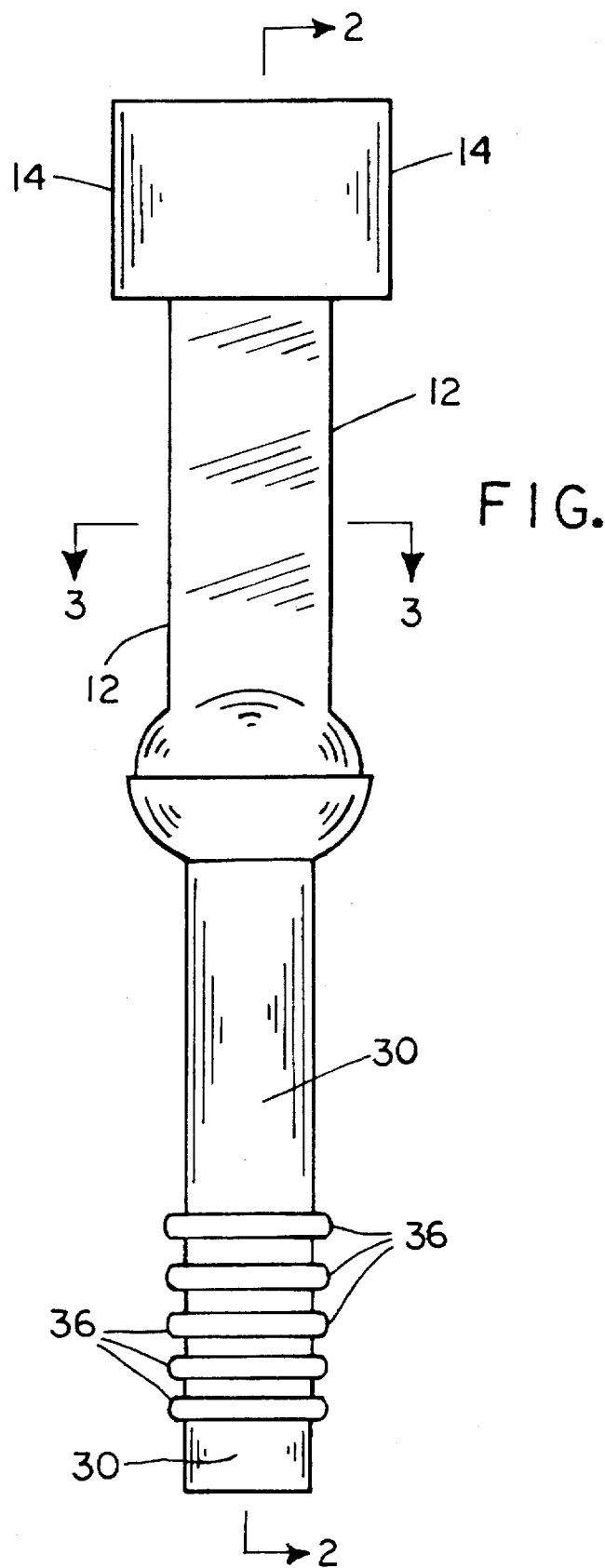
FIG. 1 is a side elevation of a square-shaped inflation incorporating the improvements of the present invention.
Figure 2:
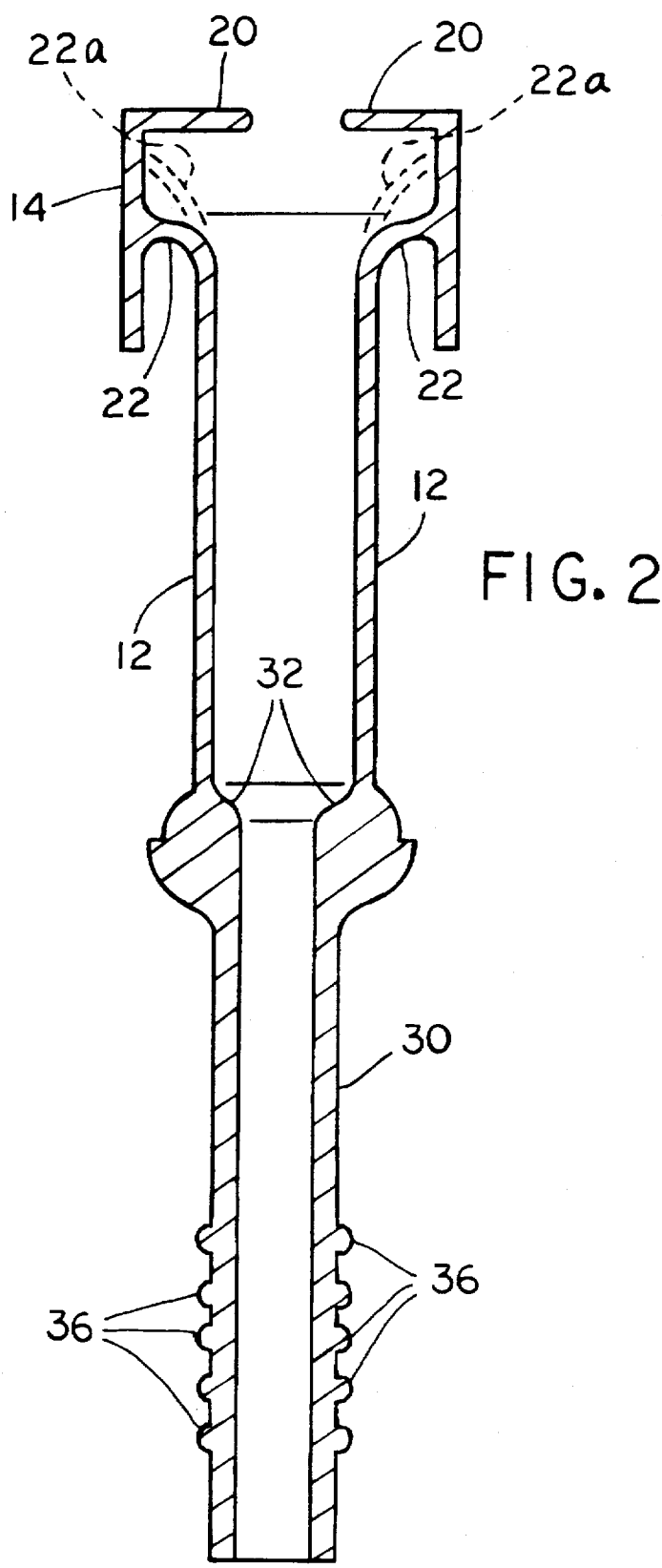
FIG. 2 is a vertical cross section through the inflation of FIG. 1 taken along line 2—2 of FIG. 1.
Figure 3:
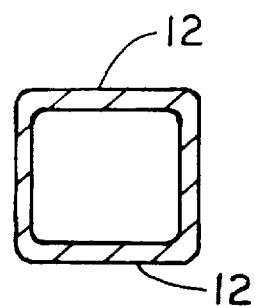
FIG. 3 is a horizontal cross section through the inflation of FIG. 1 taken along line 3—3 of FIG. 1.

The transition section 22a of a conventional, prior art inflation is shown in dotted lines in FIG. 2. As is evident from FIG. 2, the curvature of the transition section 22 of the present invention provides a significant increase in volume of the mouthpiece chamber, without any significant change in the exterior size of the cylindrical head 14 that is molded integrally to the upper end of the hollow barrel 12 of the invention, this increase in volume produces two significant and unexpected benefits. First, the increase in volume significantly improves the milking efficiency and performance of the inflation, while also maintaining good teat and udder health by optimum positioning of the inflation relative to the teat and udder. Second, the increase in volume has been unexpectedly found to significantly improve vacuum stability in the inflation. This again contributes to better efficiency and performance of the inflation while also improving the general effect on teat and udder health of the animal being milked.

In a preferred embodiment of the inflation of the present invention, an elongate, cylindrical, hollow tailpiece 30 extends from the lower end of the barrel 12, and a second transition section 32 is formed at the lower end of the barrel 12 to connect the lower end of the barrel 12 to the hollow tailpiece 30. The second transition section 32 has a curved surface that curves inwardly in a concave curve from the lower end of the barrel 12 and then curves in a convex curve downwardly to an inner surface of the hollow tailpiece 32. The radius of the concave curve is about 0.450 inch to about 0.550 inch and the radius of the convex curve is about 0.60 inch to about 0.65 inch.

Advantageously, the hollow tailpiece 30 has an inner cylindrical surface whose diameter is between about 11/32 inch and 3/8 inch, with the longitudinal length of the tailpiece 30 being between about 5.25 inches and 5.5 inches. The tailpiece 30 preferably has a wall thickness of between about 5/32 inch and 3/8 inch. It is advantageous to also provide a plurality of annular reinforcement rings 36 molded in an outer surface of the tailpiece 30 near a distal end of the tailpiece 30. The annular reinforcement rings preferably have a thickness of between about 1/16 inch and 1/8 inch, and the ring closest to the distal end of the tailpiece is spaced from the distal end of the tailpiece by a distance of between about 5/8 of an inch and about 1 inch.

Although a preferred embodiment of the improved inflation of the present invention has been illustrated and described, it is to be understood that the present disclosure is made by way of example and that various other embodiments are possible without departing from the subject matter coming within the scope of the following claims, which subject matter is regarded as the invention.

I claim:

1. An inflation that is molded as an integral unit from an elastomeric material and is used in a teat cup assembly of a milking machine, said inflation comprising an elongate, hollow barrel that has a substantially square cross-sectional shape and terminates in open upper and lower ends, with opposite sides of said barrel being spaced from each other by a distance of between about 11/16 of an inch and 13/16 of an inch; and a substantially cylindrical head molded integrally to the upper end of said barrel, said head comprising a substantially cylindrical side wall having an inner diameter that is at least about 3/8 of an inch greater than an outer diagonal dimension of said barrel;

a diaphragm-like mouthpart positioned across the otherwise open, upper end of said cylindrical side wall, said mouthpart having a central opening that is adapted to accommodate the teat of an animal to be milked; and a transition section molded in the head so as to connect the upper end of the barrel with an inner surface of said side wall to form an internal, mouthpiece chamber between the transition section and the mouthpart, said transition section having an outwardly curved surface that curves from the upper end of the barrel to an inner surface of said side wall in a smooth curve having a radius of about 0.430 inch to about 0.445 inch, and further wherein the outwardly curved surface of said transition section joins the inner surface of said side wall at a juncture that is spaced from an inner surface of said mouthpart by at least about 1/4 of an inch.

2. An inflation in accordance with claim 1 wherein an elongate, cylindrical, hollow tailpiece extends from the lower end of said barrel with a second transition section formed at the lower end of said barrel that connects the lower end of said barrel to the hollow tailpiece, said second transition section having a curved surface that curves inwardly in a concave curve from the lower end of the barrel and then curves in a convex curve downwardly to an inner surface of the hollow tailpiece, wherein the radius of the concave curve is about 0.450 inch to about 0.550 inch and the radius of the convex curve is about 0.60 inch to about 0.65 inch.

3. An inflation in accordance with claim 2 wherein the hollow tailpiece has an inner cylindrical surface whose diameter is between about 11/32 inch and 3/8 inch, with the longitudinal length of said tailpiece being between about 5.25 inches and 5.5 inches.

4. An inflation in accordance with claim 3 wherein said tailpiece has a wall thickness of about 5/32 inch and 3/8 inch.

5. An inflation in accordance with claim 4 wherein said tailpiece has a plurality of annular reinforcement rings molded in an outer surface thereof near a distal end of the tailpiece.

6. An inflation in accordance with claim 5 wherein the annular reinforcement rings have a thickness of between about 1/16 inch and 1/8 inch, and the ring closest to the distal end of the tailpiece is spaced from the distal end of the tailpiece by a distance of between about 5/8 of an inch and about 1 inch.

* * * * *